Patented Jan. 27, 1953

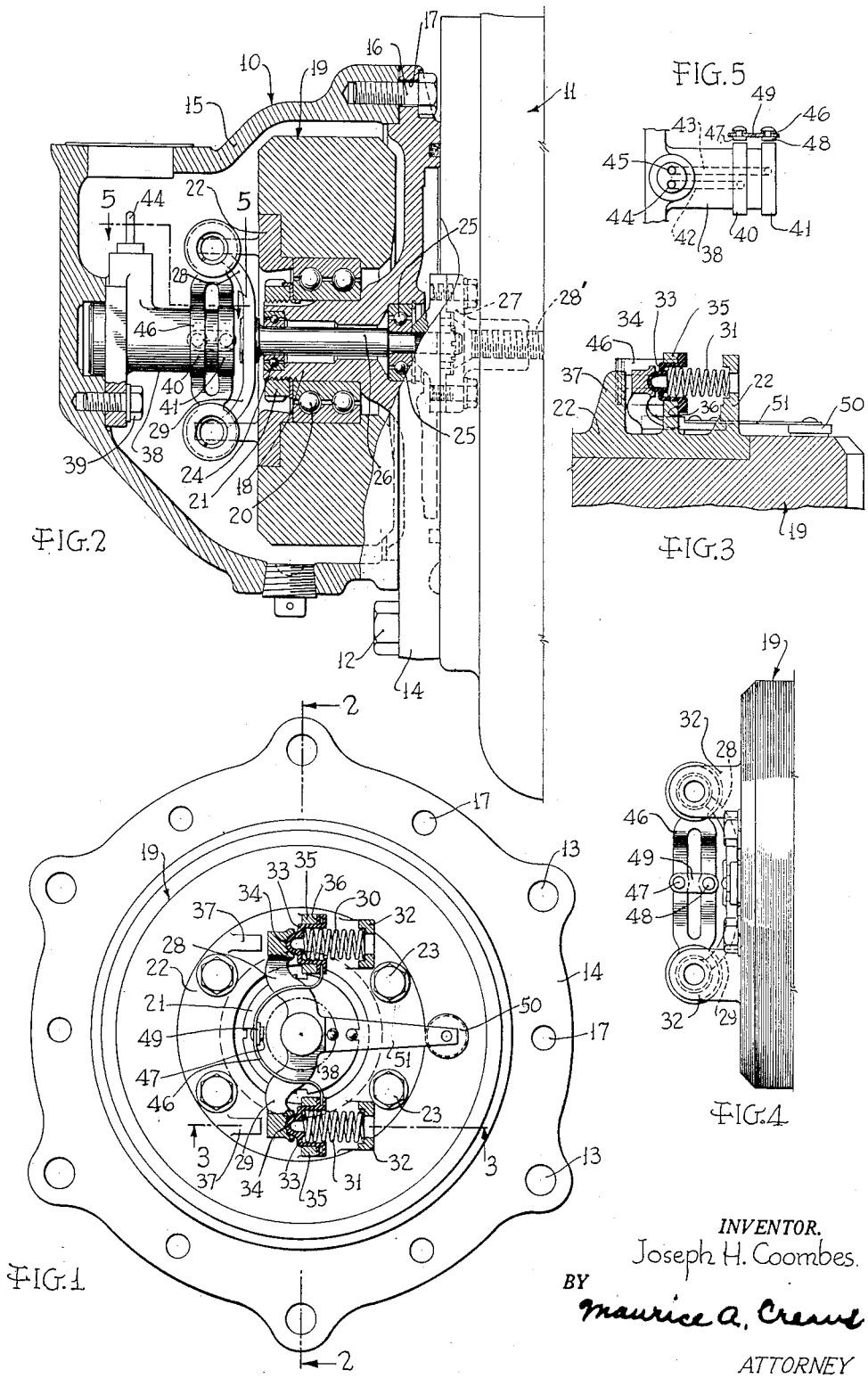

2,626,998

UNITED STATES PATENT OFFICE 2,626,998

INERTIA-CONTROLLED SWITCH DEVICE

Joseph H. Coombes, Jenkintown, Pa., assignor to The Budd Company, Philadelphia, Pa., a corporation of Pennsylvania Application September 2, 1950, Serial No. 182,911

3 Claims. (Cl. 200—52)

1

This invention relates to an inertia-controlled switch device and more particularly to such a device adapted to effect a control operation to prevent wheel slide due to excessive braking, or in the case of a driven wheel, to the application of excessive power, as in the starting of a wheeled vehicle.

The invention is directed generally to the type of inertia switch device shown in Patent No. 2,365,180 issued December 19, 1944 and entitled Brake Control Means.

It is among the objects of the invention to simplify the manufacture and assembly of such devices, thereby reducing the cost of manufacture and maintenance, to provide a device of this class in which the yielding drive between a rotatable member and a rotary inertia element is entirely independent of the switch closing means, and in which the switch closing means is a single member extending transversely of the inertia element.

These and other and further objects and advantages will become apparent from the following detailed description when read in connection with the drawings forming a part of this specification.

In the drawings:

Figure 1 is an end elevational view of the device showing it as applied to the outer end of a railway journal box, parts being omitted and parts shown in section;

Figure 2 is a vertical sectional view, the section being taken substantially along the line 2—2 of Figure 1;

Figure 3 is a detail sectional view, the section being taken substantially along the line 3—3 of Figure 1;

Figure 4 is a fragmentary elevational view of the inertia element with parts carried thereby; and Figure 5 is a fragmentary plan view, parts being shown in section, the view being taken substantially along the line 5—5 of Figure 2.

The inertia switch device of the invention is mounted similarly to the device shown in the patent above referred to, in a casing, designated generally by 10, bolted to the open end of the journal box 11, by bolts as 12 passing through openings 13, see Figure 1, the casing taking the place of the usual journal box cover.

The casing in this instance, comprises a back plate 14 bolted to the journal box by the bolts 12 and an axially outer casing part 15, bolted to the back plate 14 by the bolts, as 16, passing through openings 17, see Figures 1 and 2, in the back plate.

2

The back plate 14 is provided centrally with an outwardly projecting boss 18 upon which a rotary inertia element 19 is mounted for free rotation on the ball bearing 20. The inner race of the ball bearing is held in place by a nut 21 screwed on the end of the boss and the outer race, by ball bearing retainer plate 22, suitably removably secured, as by the bolts 23, see Figure 1, to the main body of the inertia element 19 and forming a part rotating therewith.

The boss 18 is hollow, and carries, through the spaced anti-friction bearings 24 and 25, a rotary member or shaft 26, the inner end of which is connected by a union 27 to a flexible shaft 28′, suitably connected to be driven by the axle (not shown).

The rotary inertia element 19 is yieldingly driven from this rotary member or shaft 26, through arms 28, 29 of similar configuration and length, these arms extending generally radially from the outer end of the shaft and in opposite directions, see Figure 1.

The ends of these arms are each coupled to the inertia element through springs 30 and 31, respectively. These springs are preferably calibrated, so that they yield under a predetermined force. One end of each spring rests against an abutment 32 on the inertia element plate 22 while the other end engages a cup element 33 which in turn has a rounded projection 34 from its base seated in a corresponding rounded depression in the end of the adjacent arm 28 or 29. The cup elements are guided for sliding movement in projections 35 extending from the outer face of the inertia element plate 22. Shoulders 36 in the cups engage the respective projections to limit the movement of the respective cups under the pressure of the respective springs. To prevent excessive relative movement between the arms and the inertia element, abutments 37, 37 are provided, with which the ends of the arms may engage to prevent such excessive movement.

As clearly shown in Figures 2 and 4, the radially outer ends of the arms 28 and 29 are axially outwardly offset from their inner ends and an insulated plug 38, secured to outer wall of casing portion 15, as by bolts 39, extends coaxially with the shaft 26 axially between these radially outer ends of the arms.

The insulated plug carries the spaced collector rings as 40 and 41 which are in turn connected by conductors 42 and 43, see Figure 5, to the binding posts 44, 45 for connection into an outside control circuit.

In cooperative relation to the collector rings, is arranged a transversely extending member 46 preferably bifurcated between its ends and carrying on the furcations the contact buttons 47, 48, respectively, interconnected by a bridging member 49. The intermediate portion of the member 46 carrying the contact buttons is bent around the insulated plug 36 so that the contact buttons thereon are normally spaced slightly from the respective collector rings, see Figure 1. The ends of the member 46, which may be a light spring member, are secured to the cups 33. These cups are preferably made of insulating material which may be molded around the ends of the member 46.

If the cups are made of insulating material, as is preferred, the attachment of the contact buttons and bridging member is facilitated, since it is not necessary to insulate them from the member 46.

To dampen the action of the inertia element 19, the device is shown provided with a damping brake shoe 50 which is pressed against the axially outer face of the inertia element by a spring arm 51 secured to the outer end of the shaft 26, see Figure 1.

With this arrangement, the operation of the device is very sensitive, or can be set to be so, depending on the calibration of the springs, and the transverse contact carrying member can be made very light, since it is not a part of the resilient drive between the parts.

The operation of the device will now be briefly described. Normally the parts are in the position shown in the drawings, with the springs 30, 31 expanded. Assuming the shaft is rotating in the clockwise direction, the inertia member 19 will be driven through the upper spring 30, in clockwise direction also. If for any reason, such as a slipping wheel, the axle decelerates rapidly, the inertia element will overrun the driving member, causing the lower spring 31 to be compressed, and at the same time moving the contacts 47, 48 on the transverse member 46 into engagement with the collector rings 40, 41 to close a control circuit. Similarly, if the axle accelerates at an abnormal rate, as in applying excessive power to the axle, as in starting the vehicle, the inertia element lags behind, causing the upper spring 30 to be compressed and again moving the contacts 47, 48 into engagement with the collector rings 40, 41 to close the control circuit.

While a specific embodiment of the invention has been herein described in detail, it will be understood that changes and modifications may be made by those skilled in the art without departing from the spirit and scope of the invention as expressed in the claims appended hereto.

What is claimed is:

1. A rotary inertia switch device comprising a rotatable member having oppositely generally radially extending arms of equal lengths, an inertia element mounted to rotate concentrically therewith and driven thereby, yielding means inserted in said drive and permitting overrun or lag of the inertia element under conditions of abnormal acceleration or deceleration of said rotatable member, flanged cups shiftably mounted on guides on said inertia member, said yielding means comprising coil springs, bearing through one of their ends through said spring cups upon the respective arms and having their opposite ends engaged with respective abutments on the inertia element, and means connected to said cups and operable by the movement of either of said cups toward the associated abutment, upon predetermined overrun or lag of said inertia element, for instigating a control function.

2. A rotary inertia control device comprising a rotatable member having oppositely generally radially extending arms of equal lengths, an inertia element mounted to rotate concentrically therewith and driven thereby, yielding means inserted in said drive and permitting overrun or lag of the inertia element under conditions of abnormal acceleration or deceleration, flanged cups shiftably mounted on guides on said inertia member, said yielding means comprising coil springs bearing through one of their ends through said spring cups upon the respective arms and having their opposite ends engaged with respective abutments on the inertia element, a transverse member interconnecting said spring cups and carrying electrical contact elements intermediate its ends, fixed contact elements near the contact elements carried by said transverse member, said member being operable, by the movement of either of said cups toward the associated abutment upon predetermined overrun or lag of said inertia element, for movement of its contact elements in relation to said fixed contact elements instigating a control function.

3. A rotary inertia control device comprising a rotatable member having oppositely generally radially extending arms of equal lengths, an inertia element mounted to rotate concentrically therewith and driven thereby, yielding means inserted in said drive and permitting overrun or lag of said inertia element under conditions of abnormal acceleration or deceleration of said rotatable member, flanged cups of electrical insulating material shiftably mounted on guides on said inertia member, said yielding means comprising coil springs bearing through one of their ends through said spring cups upon the respective arms and having their opposite ends engaged with respective abutments on the inertia element, said cups having their flanges normally engaging their guides for limiting the outward expansion of said springs, a transverse switch member having its ends embedded in the material of said cups and carrying intermediate its ends a contact slightly spaced from a cooperating stationary contact, said switch member being movable to engage said contacts to instigate a control function by the movement of either of said cups toward the associated abutments upon predetermined overrun or lag of said inertia element.

JOSEPH H. COOMBES.

REFERENCES CITED

The following references are of record in the file of this patent:

UNITED STATES PATENTS

| Number | Name | Date |
| --- | --- | --- |
| 1,560,844 | Olds | Nov. 10, 1925 |
| 2,068,370 | Bush | Jan. 19, 1937 |
| 2,272,601 | Eksergian | Feb. 10, 1942 |
| 2,365,180 | Eksergian | Dec. 19, 1944 |
| 2,369,726 | Eksergian | Feb. 20, 1945 |
| 2,415,344 | Eksergian | Feb. 4, 1947 |
| 2,519,124 | Eksergian | Aug. 15, 1950 |